United States Patent
Yang et al.

(10) Patent No.: US 11,106,295 B2
(45) Date of Patent: Aug. 31, 2021

(54) TOUCH-CONTROL PIXEL-DRIVING CIRCUIT AND METHOD THEREOF, A TOUCH-CONTROL DISPLAY APPARATUS

(71) Applicant: BOE TECHNOLOGY GROUP CO., LTD., Beijing (CN)

(72) Inventors: Shengji Yang, Beijing (CN); Xue Dong, Beijing (CN); Jing Lv, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 688 days.

(21) Appl. No.: 15/777,599

(22) PCT Filed: Sep. 27, 2017

(86) PCT No.: PCT/CN2017/103654
§ 371 (c)(1),
(2) Date: May 18, 2018

(87) PCT Pub. No.: WO2018/205486
PCT Pub. Date: Nov. 15, 2018

(65) Prior Publication Data
US 2021/0173544 A1      Jun. 10, 2021

(30) Foreign Application Priority Data
May 12, 2017    (CN) .......................... 201710334833.5

(51) Int. Cl.
*G06F 3/041* (2006.01)
*G06F 3/042* (2006.01)
(Continued)

(52) U.S. Cl.
CPC ............ *G06F 3/0412* (2013.01); *G06F 3/042* (2013.01); *G06F 3/0416* (2013.01);
(Continued)

(58) Field of Classification Search
CPC .... G06F 3/041; G06F 3/0412; G06F 3/04166; G06F 3/042; G09G 3/3225; G09G 3/3291; G09G 2310/0251; G09G 2310/061
See application file for complete search history.

(56) References Cited

U.S. PATENT DOCUMENTS

| | | | |
|---|---|---|---|
| 2013/0187853 A1 | 7/2013 | Yuan et al. | |
| 2014/0145917 A1* | 5/2014 | Kwak ................... | G09G 3/3233 345/82 |

(Continued)

FOREIGN PATENT DOCUMENTS

| | | |
|---|---|---|
| CN | 103996376 A | 8/2014 |
| CN | 104064140 A | 9/2014 |

(Continued)

OTHER PUBLICATIONS

International Search Report & Written Opinion dated Feb. 14, 2018, regarding PCT/CN2017/103654.
(Continued)

*Primary Examiner* — Michael J Eurice
(74) *Attorney, Agent, or Firm* — Intellectual Valley Law, P.C.

(57) ABSTRACT

The present application discloses a touch-control pixel-driving circuit. The circuit includes a driving transistor coupled to a data line and a read line; an organic light-emitting diode (OLED) coupled to the driving transistor. The circuit also includes a light-sensing-touch sub-circuit coupled to the data line and the read line and configured to be reset by a first and a second control signals to send a raw signal flour the data line to the read line, and to generate a sensing signal depended on a change of the raw signal due to a touch and send the sensing signal to the read line. Further, the circuit includes a driving sub-circuit coupled to the driving transistor and configured to charge and discharge (Continued)

the driving transistor using a power-supply voltage and a data signal controlled by the first, the second, and a third control signals, and to drive the OLED for emitting light.

16 Claims, 8 Drawing Sheets

(51) Int. Cl.
  *G09G 3/3225* (2016.01)
  *G09G 3/3291* (2016.01)
(52) U.S. Cl.
  CPC ....... *G06F 3/04166* (2019.05); *G09G 3/3225* (2013.01); *G09G 3/3291* (2013.01)

(56) References Cited

U.S. PATENT DOCUMENTS

| 2016/0062522 A1* | 3/2016 | Yang | G09G 3/3291 345/174 |
| 2016/0246409 A1 | 8/2016 | Yang | |
| 2016/0274719 A1 | 9/2016 | Yang et al. | |
| 2016/0291743 A1 | 10/2016 | Yang et al. | |
| 2016/0378232 A1 | 12/2016 | Hsu et al. | |
| 2018/0005566 A1* | 1/2018 | Kurokawa | G06N 3/084 |
| 2018/0180951 A1* | 6/2018 | Toyotaka | G02F 1/133345 |

FOREIGN PATENT DOCUMENTS

| CN | 104091563 A | 10/2014 |
| CN | 104217677 A | 12/2014 |
| CN | 105679251 A | 6/2016 |
| JP | 2014525100 A | 9/2014 |
| KR | 20140067583 A | 6/2014 |
| KR | 20170001645 A | 1/2017 |

OTHER PUBLICATIONS

Notice of Grant of Patent in the Korean Patent Application No. 20187015990, dated Dec. 11, 2019; English translation attached.
First Office Action in the Japanese Patent Application No. 2018534861, dated Mar. 30, 2020; English translation attached.

* cited by examiner

TOUCH-CONTROL PIXEL-DRIVING CIRCUIT AND METHOD THEREOF, A TOUCH-CONTROL DISPLAY APPARATUS

CROSS-REFERENCE TO RELATED APPLICATION

This application is a national stage application under 35 U.S.C. § 371 of International Application No. PCT/CN2017/103654, filed Sep. 27, 2017, which claims priority to Chinese Patent Application No. 201710334833.5, filed May 12, 2017, the contents of which are incorporated by reference in the entirety.

TECHNICAL FIELD

The present invention relates to display technology, more particularly, to a pixel-driving circuit and a method thereof, a display panel, and a display apparatus having the same.

BACKGROUND

Active Matrix Organic Light Emitting Diode (AMOLED) display draws major interests of researchers on the field of display apparatus. It indeed shows many advantages over other types of displays in small power consumption, low cost of manufacture, self-luminous, wide viewing angle, and last response rate and has been applied in a wide range of products like smart phone, PDA, digital camera, and more.

A conventional AMOLED display merely was used for displaying images with a pixel-driving circuit associated with each pixel of the display being configured only to drive an corresponding organic light-emitting diode for emitting light. A current trend of display technologies is to make a display apparatus having additional functions rather than just having a display function. For example, it is desired that a display apparatus, particularly the AMOLED display apparatus, can also have a touch-control function.

SUMMARY

In an aspect, the present disclosure provides a touch-control pixel-driving circuit in a display apparatus. The circuit includes a driving transistor coupled to a data line and a read line. Additionally, the circuit includes an organic light-emitting diode (OLED) having a first electrode coupled to the driving transistor and the read line. The circuit also includes a second electrode coupled to a reference voltage terminal. Furthermore, the circuit includes a light-sensing-touch sub-circuit coupled to the data line and the read line and configured to be reset by a first control signal and a second control signal to send a raw signal to the read line based on a high-level voltage at the data line, and to generate a sensing signal depended on a change of the raw signal due to a touch and send the sensing signal to the read line. Moreover, the circuit includes a driving sub-circuit coupled to the driving transistor and configured to charge and discharge the driving transistor using a power-supply voltage from a power terminal and a data signal from the data line controlled by the first control signal, the second control signal and a third control signal, and to drive the OLED for emitting light.

Optionally, the light-sensing-touch sub-circuit includes a photo transistor, a reset sub-subcircuit coupled to the photo transistor and the data line and configured to receive the first control signal, a transport sub-subcircuit coupled to the photo transistor and the read line and configured to receive the second control signal, and a storage sub-subcircuit coupled to the photo transistor for storing a current signal converted by the photo transistor sensing a light signal.

Optionally, the reset sub-subcircuit includes a first transistor having a control terminal being provided with the first control signal, a first terminal coupled to the data line, and a second terminal coupled a control terminal and a second terminal of the photo transistor. The first control signal is configured to provide a turn-on signal to make the first transistor in conduction state in a reset period to allow an initial data signal at a high voltage level from the data line as the raw signal to be passed to the photo transistor.

Optionally, the photo transistor is configured to generate a photocurrent signal upon being illuminated by an external light signal. The photocurrent signal is added to the raw signal as a change of the raw signal.

Optionally, the transport sub-subcircuit includes a second transistor having a control terminal being provided with the second control signal, a first terminal coupled to a first terminal of the photo transistor, and a second terminal coupled to the read line. The second control signal is configured to provide a turn-on signal to make the second transistor in conduction state to allow the either the raw signal or the change of the raw signal from the photo transistor to be passed to the read line.

Optionally, the storage sub-subcircuit includes a first capacitor having a first electrode coupled to a first terminal of the photo transistor and a second electrode coupled to a control terminal of the photo transistor.

Optionally, the driving sub-circuit includes a charger sub-subcircuit and a regulator sub-subcircuit. The charger sub-subcircuit is configured to couple with the power terminal, the driving transistor, and the reference voltage terminal, and is configured to receive the first control signal and the second control signal to control charging or discharging of the driving transistor by the power-supply voltage from the power terminal. The regulator sub-subcircuit is configured to couple with the data line and the driving transistor, and configured to receive the third control signal to regulate a voltage level at a control terminal of the driving transistor.

Optionally, the charger sub-subcircuit is further configured to receive the second control signal to make the driving transistor in conduction state for passing a driving current to drive the OLED for emitting light.

Optionally, the charger sub-subcircuit includes a third transistor having a control terminal being provided with the second control signal, a first terminal coupled to the power terminal, and a second terminal coupled to a first terminal of the driving transistor. Additionally, the charger sub-subcircuit includes a fourth transistor having a control terminal being provided with the first control signal, a first terminal coupled to the second terminal of the third transistor, and a second terminal coupled to the control terminal of the driving transistor. The charger sub-subcircuit thriller includes a fifth transistor having a control terminal being provided with the first control signal, a first terminal coupled to a second terminal of the driving transistor, and a second terminal coupled to the reference voltage terminal.

Optionally, the regulator sub-subcircuit includes a sixth transistor and a second capacitor. The sixth transistor has a control terminal being provided with the third control signal, a first terminal coupled to the data line, and a second terminal coupled to a first electrode of the second capacitor. The second capacitor has a second electrode coupled to the control terminal of the driving transistor.

Optionally, the power terminal provides the power-supply voltage at a high voltage level and the reference voltage terminal is grounded at a low voltage level.

In another aspect, the present disclosure provides a method for driving the touch control pixel-driving circuit described herein in a driving cycle including a first period, a second period, a third period, and a fourth period. The method includes resetting the light-sensing-touch sub-circuit upon the first control signal to charge a power-supply voltage into a control terminal of the driving transistor further upon the second control signal in the first period. Additionally, the method includes discharging the control terminal of the driving transistor in the second period with the first control signal been maintained to keep the light-sensing-touch sub-circuit in a same state as in the first period. The method further includes sensing a light signal which is converted to a current signal, in the third period and writing a data signal into the control terminal of the driving transistor controlled by the third control signal. Furthermore, the method includes transporting the current signal to the read line in the fourth period and using the second control signal to control a driving current through the driving transistor for causing the OLED to emit light.

Optionally, the second control signal and the third control signal are set with high or low voltage levels in a same period of the first period, the second period, the third period, and the fourth period.

Optionally, each of the driving transistor, the photo transistor, the first transistor, the second transistor, the third transistor, the fourth transistor, the fifth transistor, and the sixth transistor is provided as a N-type thin-film transistor. The first control signal is set to a high voltage level in the first period and the second period and set to a low voltage level in the third period and the fourth period. The second control signal is set to the high voltage level in the first period, the low voltage level in the second period and the third period, and the high voltage level in the fourth period. The third control signal is set to the low voltage level in the first period, the high voltage level in the second period and the third period, and the low voltage level in the fourth period.

Optionally, the second control signal and the third control signal have a same voltage level in a same period of the first period, the second period, the third period, and the fourth period.

Optionally, the sixth transistor is provided as a P-type thin-film transistor and each of the driving transistor, the photo transistor, the first transistor, the second transistor, the third transistor, the fourth transistor, and the fifth transistor is provided as a N-type transistor. The first control signal is set to a high voltage level in the first period and the second period, the low voltage level in the third period and the fourth period. Both the second control signal and the third control signal are set to the high voltage level in the first period, the low voltage level in the second period and the third period, and the high voltage level in the fourth period.

Optionally, each of the second transistor and the third transistor is provided as a P-type thin-film transistor and each of the driving transistor, the photo transistor, the first transistor, the fourth transistor, the fifth transistor, and the sixth transistor is provided as a N-type thin-film transistor. The first control signal is set to a high voltage level in the first period and the second period, the low voltage level in the third period and the fourth period. Both the second control signal and the third control signal are set to the low voltage level in the first period, the high voltage level in the second period and the third period, and the low voltage level in the fourth period.

In yet another aspect, the present disclosure provides a touch display apparatus including a display area having a plurality of subpixel regions arranged in an array of matrix divided by an inter-subpixel region. At least one subpixel of the plurality of subpixel regions includes a light-sensing-touch sub-circuit of the touch-control pixel-driving circuit described herein.

Optionally, each of a sub-set of the plurality of subpixel regions includes the light-sensing-touch sub-circuit. The sub-set of the plurality of subpixel regions is arranged in a periodic arrangement in the display area.

Optionally, the touch display apparatus further includes a signal processing block configured to process the photocurrent signal converted from a light signal sensed by the light-sensing-touch sub-circuit to determine whether a touch occurs on the display area and determine corresponding touch location on the display area if the touch is determined. The touch is either a laser beam illumination or a finger touch.

Optionally, the signal processing block includes an amplifier and a processor. The amplifier is coupled to the light-sensing-touch sub-circuit to receive the photocurrent signal to generate an amplified signal. The processor is coupled to the amplifier to compare an intensity difference between the amplified signal with a raw signal with a non-touching threshold value and determine a touch occurrence and corresponding touch location if the intensity difference is greater than the non-touching threshold value or determine no touch occurrence if the intensity difference is smaller than the non-touching threshold value.

Optionally, the touch location determined with a X coordinate based on a control line location from which a second control signal is outputted and a Y coordinate based on a location of the light-sensing-touch sub-circuit along a read line from which the photocurrent signal is collected

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Under the current display technology development tread, touch-control technologies including capacitive touch technology have been implemented for some conventional display apparatuses. An alternative touch technology is light-sensitive touch technology. Unlike the capacitive touch technology, the light-sensitive touch technology uses light intensity change to sense touch locations, providing high sensitivity to a touch motion and independency of dimensions of the touch sensor modules in the display apparatus. Additionally, light-sensitive touch technology not only supports direct finger touch control but also supports laser pen touch control from a remote distance. It is preferred to implement the light-sensitive touch function into an AMOLED display apparatus to make it capable of displaying image as well as supporting light-sensitive touch control.

Accordingly, the present disclosure provides, inter alia, a touch-control pixel-driving circuit, a display panel, and a display apparatus having the same, and a driving method thereof that substantially obviate one or more of the problems due to limitations and disadvantages of the related art.

Figure 1:
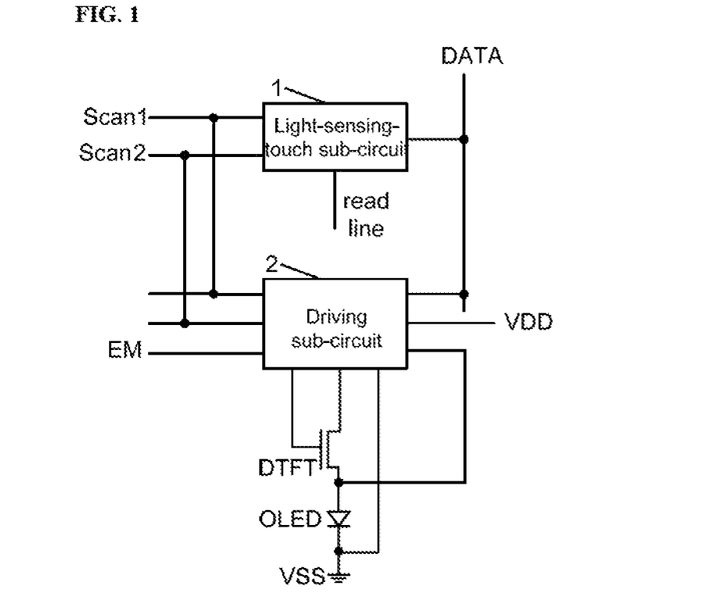
FIG. 1 is a simplified block diagram of a touch-control pixel-driving circuit according to an embodiment of the present disclosure.

In one aspect, the present disclosure provides a touch-control pixel-driving circuit for an AMOLED display panel. FIG. 1 is a simplified block diagram of a touch-control pixel-driving circuit according to an embodiment of the present disclosure. Referring to FIG. 1, the touch-control pixel-driving circuit includes a light-sensing touch sub-circuit 1, a driving sub-circuit 2, a driving transistor DTFT, and an organic light-emitting diode OLED.

The light-sensing touch sub-circuit 1 has a first control terminal coupled to a first scan line Scan1, a second control terminal coupled to a second scan line Scan2, a first terminal coupled to a data line DATA, and a second terminal coupled to a read line. In the embodiment, the light-sensing touch sub-circuit is configured to perform a rest operation under controls of a first control signal received at the first control terminal from the first scan line Scan1 and a second control signal received at the second control terminal from the second scan line Scan2. Further, the light-sensing touch sub-circuit is configured to send an initial signal to the read line, to sense a touch, and to send a corresponding touch signal to the read line.

The driving sub-circuit 2 has a first control terminal coupled to the first scan line Scan1, a second control terminal coupled to the second scan line Scan2, a third control terminal coupled to a third scan line EM, a first terminal coupled to the data line DATA, a second terminal coupled to a power supply VDD, a third terminal coupled to a second terminal of the driving transistor DTFT, a fourth terminal coupled to a control terminal of gate of the driving transistor DTFT, a fifth terminal coupled to a first terminal of the driving transistor DTFT, a sixth terminal coupled to a reference voltage terminal VSS and a second terminal of the OLED.

In the embodiment, the driving sub-circuit 2 is configured to use the power supply voltage VDD and a data signal from the data line DATA to charge or discharge the control terminal of the driving transistor DTFT under the controls of the first control signal from Scan1, the second control signal from Scan2, and a third control signal from the third scan line EM. Further, the driving sub-circuit is configured to drive the OLED for emitting light.

Optionally, the touch-control pixel-driving circuit is applied to an AMOLED display apparatus, in which the light-sensing sub-circuit 1 and the driving sub-circuit respectively carry a touch control function and a display function in the same AMOLED display apparatus. In other words, the touch-control pixel-driving circuit is able to drive the AMOLED display apparatus for displaying images and to drive it to perform touch control operation based on a light-sensitive touch function on its display panel, enhancing the value of the AMOLED display apparatus. Since the AMOLED display panel is configured to use a driving current to drive the OLED in each subpixel to emit light and no liquid crystal material as gray scale display media, the light-sensing touch control will not affect the image display.

Referring to FIG. 1, the touch-control pixel-driving circuit only uses three control signals from the first scan line Scan1, the second scan line Scan2, and the third scan line EM to allow the light-sensing-touch sub-circuit 1 and driving sub-circuit 2 to realize respective functions. This circuitry structure substantially reduces numbers of scan lines, particularly reducing the number of signal lines used for providing touch control signals for the touch-control pixel-driving circuit compared with traditional approach. Thus, the touch-control pixel-driving circuit disclosed herein reduces a complexity of implementing touch control function to an AMOLED display apparatus.

Figure 2:
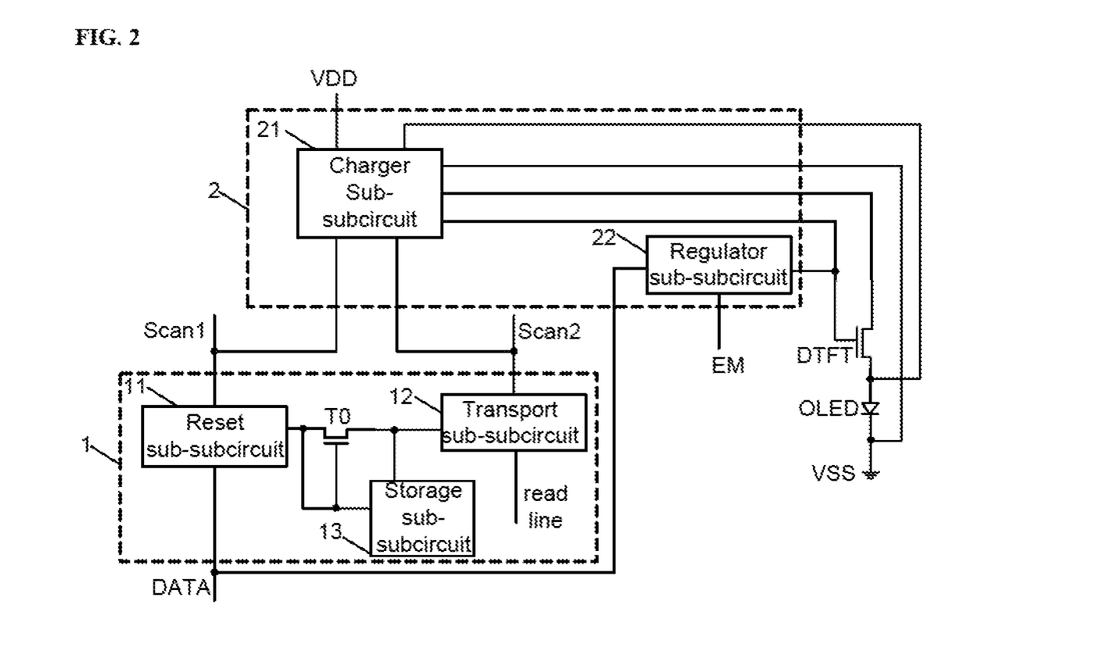
FIG. 2 is a simplified block diagram of a touch-control pixel-driving circuit according to another embodiment of the present disclosure.

FIG. 2 is a simplified block diagram of a touch-control pixel-driving circuit according to another embodiment of the present disclosure. Referring to FIG. 2, in an embodiment, the light-sensing-touch sub-circuit 1 includes a photo transistor T0, a reset sub-subcircuit 11, a transport sub-subcircuit 12, and a storage sub-subcircuit 13. The reset sub-subcircuit 11 has a control terminal coupled to the first scan line Scan1, a first terminal coupled to a data line DATA, and a second terminal coupled to a control terminal and a second terminal of the photo transistor T0. In the embodiment, the reset sub-subcircuit 11 is configured to reset the photo transistor T0 and the storage sub-subcircuit 13 under the controls of a first control signal from the first scan line Scan1 and a second control signal from the second scan line Scan2.

Referring to FIG. 2, the transport sub-subcircuit 12 has a control terminal coupled to the second scan line Scan2, a first terminal coupled to a first terminal of the photo transistor T0, and a second terminal coupled to a read line. In the embodiment, the transport sub-subcircuit 12 is configured to pass an initial signal of the photo transistor T0 to the read line under the control of the second control signal. The photo transistor T0 is to sense an external light signal and convert the light signal to an electrical signal. The storage sub-subcircuit 13 is coupled to the control terminal and the first terminal of the photo transistor T0 and is used for storing the electrical signal converted by the photo transistor from the light signal. The transport sub-subcircuit 12 further is configured to pass the electrical signal to the read line under the control of the second control signal.

Referring to FIG. 2 again, the driving sub-circuit 2 includes a charger sub-subcircuit 21 and a regulator sub-subcircuit 22. The charger sub-subcircuit 21 has a first control terminal coupled to the first scan line Scan1, a second control terminal coupled to the second scan line Scan2, a first terminal coupled to a power supply VDD, a second terminal coupled to the second terminal of the driving transistor DTFT, a third terminal coupled to the control terminal or gate of the driving transistor DTFT, a fourth terminal coupled to the first terminal of the driving transistor DTFT, and a fifth terminal coupled to a reference voltage terminal VSS. In the embodiment, the charger sub-subcircuit 21 is configured to charge or discharge from the power supply VDD to the control terminal of the driving transistor DTFT under the controls of the first control signal and the second control signal. During the process, the power supply VDD is controlled to not be transported to the OLED.

Also Referring to FIG. 2, the regulator sub-subcircuit 22 has a control terminal coupled to a third scan line EM, a first terminal coupled to the data line DATA, and a second terminal coupled to the control terminal or gate of the driving transistor DTFT. In the embodiment, the regulator sub-subcircuit 22 is configured to write a data signal from the data line DATA to the control terminal of the driving transistor DTFT under the control of a third control signal from the third scan line EM to stabilize a voltage level at the control terminal of the driving transistor DTFT. Further, the charger sub-subcircuit 21 is also configured to turn the driving transistor into a conduction state under the control of the second control signal to drive the OLED to emit light.

Figure 3:
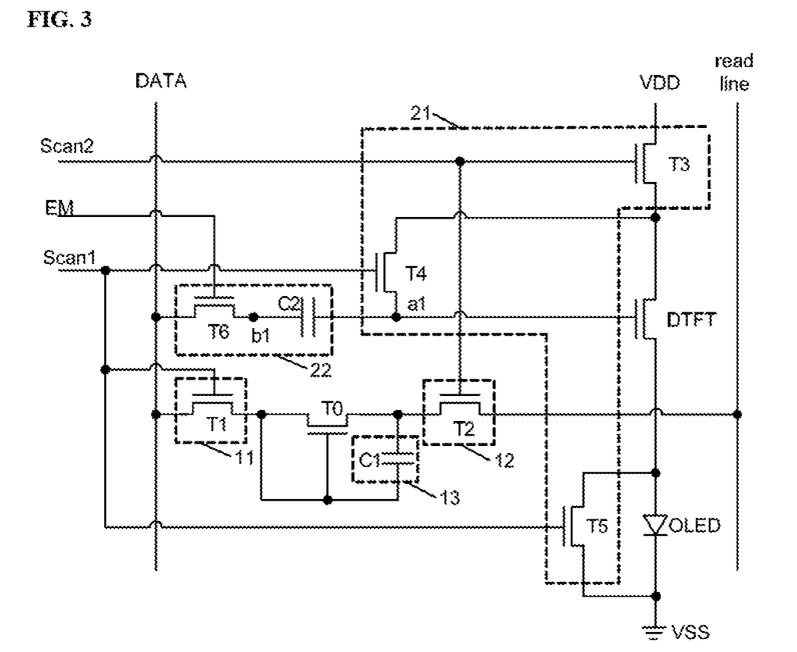
FIG. 3 is a circuit structure of a touch-control pixel-driving circuit according to an embodiment of the present disclosure.

FIG. 3 is a circuit structure of a touch-control pixel-driving circuit according to an embodiment of the present disclosure. Referring to FIG. 3, in a specific embodiment, the reset sub-subcircuit 11 includes a first transistor T1 having a control terminal or gate coupled to the first scan line Scan1, a first terminal coupled to the data line DATA, and a second terminal coupled to the control terminal or gate and the second terminal of the photo transistor T0. The light-sensing-touch sub-subcircuit 12 includes a second transistor T2 having a control terminal or gate coupled to the second scan line Scan2, a first terminal coupled to the first terminal of the photo transistor T0, and a second terminal coupled to the read line. The storage sub-subcircuit 13 includes a first capacitor C1 having a first plate terminal coupled to the first terminal of the photo transistor T0 and a second plate terminal coupled to the control terminal of the photo transistor T0.

Referring to FIG. 3, the charger sub-subcircuit 21 in the driving sub-circuit 2 includes a third transistor T3, a fourth transistor T4, and a fifth transistor T5. The third transistor T3 has a control terminal coupled to the second scan line Scan2, a first terminal coupled to the power supply VDD, and a second terminal coupled, to the first terminal of the driving transistor DTFT. The fourth transistor T4 has a control terminal coupled to the first scan line Scan1, a first terminal coupled to the second terminal of the third transistor T3, and a second terminal coupled to the control terminal of the driving transistor DTFT. The fifth transistor T5 has a control terminal coupled to the first scan line Scan1, a first terminal coupled to the second terminal of the driving transistor DTFT, and a second terminal coupled to the reference voltage terminal VSS.

The regulator sub-subcircuit 22 in the driving sub-circuit 2 includes a sixth transistor T6 and a second capacitor C2. The sixth transistor T6 has a control terminal coupled to the third scan line EM, a first terminal coupled to the data line DATA, and a second terminal coupled to a first plate terminal of the second capacitor C2. A second plate terminal of the second capacitor C2 is coupled to the control terminal of the driving transistor DTFT.

Figure 4:
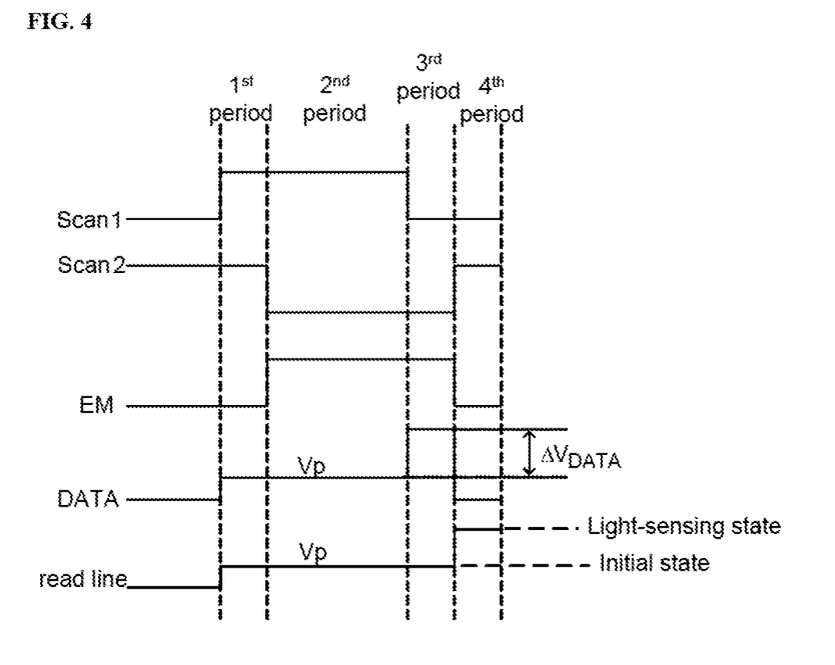
FIG. 4 is a timing diagram of operating the touch-control pixel-driving circuit of FIG. 3 in one driving cycle according to an embodiment of the present disclosure.

In some embodiments, the touch-control pixel-driving circuit disclosed herein is configured to operate in each driving cycle of driving light emission and touch-sensing where the driving cycle includes a first period, a second period, a third period, and a fourth period. FIG. 4 is a timing diagram of operating the touch-control pixel-driving circuit of FIG. 3 in one driving cycle according to an embodiment of the present disclosure. Referring to FIG. 4, Scan1 is referred to the first control signal, Scan2 is referred to the second control signal, and EM is referred to the third control signal. DATA represents the data signal. RL represents a signal collected by the read line. Optionally, the control signals in the FIG. 4 correspond to an optional circuitry setup in which all transistors, including the driving transistor DTFT, the photo transistor T0, the first transistor T1 through the sixth transistor T6, are selected to be N-type transistors. Optionally, all the transistors are thin-film transistors made by low-temperature polysilicon technology or silicon-based manufacture processes. Optionally, a gate of each thin-film transistor is its control terminal and a source of each transistor is referred to a first terminal and a drain of each transistor is referred to a second terminal. The first terminal and the second terminal may be interchanged.

Figure 5:
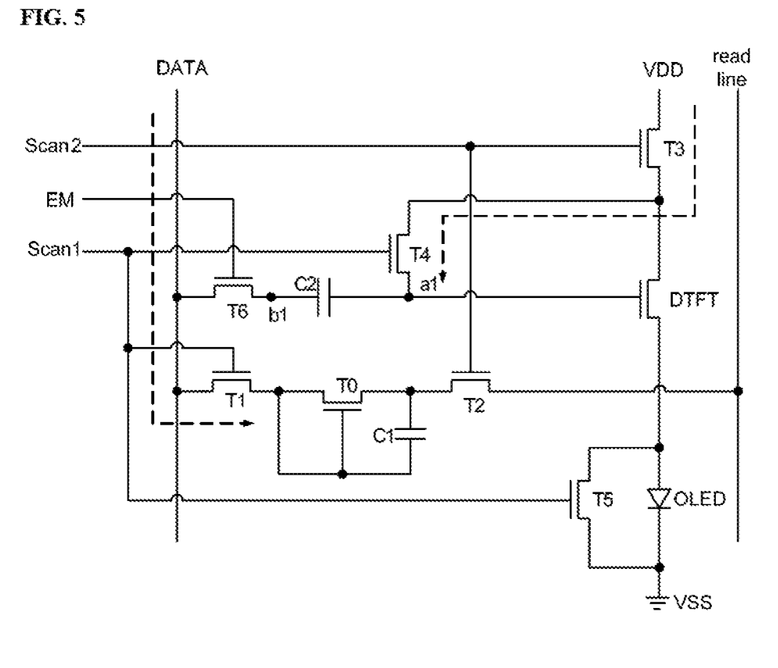
FIG. 5 is a circuit structure of a touch-control pixel-driving circuit operated in a first period according to an embodiment of the present disclosure.

In the first period shown in the FIG. 4, an operation state of the circuit of FIG. 3 is shown in FIG. 5. Particularly for the light-sensing-touch sub-circuit, the first control signal Scan1 is at a high voltage level. The first transistor T1 is turned on in a conduction state. The data signal DATA is provided as a high voltage level at Vp. This data signal is able to reset the second plate terminal of the first capacitor C1 and the control terminal and the first terminal of the photo transistor T0, making the photo transistor T0 after resetting to have an initial signal with a voltage level Vp. In this period, the second control signal Scan2 also is at a high voltage level. The second transistor T2 is turned on to a conduction state. The initial signal at the photo transistor T0 can be passed to the read line, i.e., the read line collects the initial signal Vp of the photo transistor T0.

For the driving sub-circuit, the first control signal Scan1 is at a high voltage level to make the fourth transistor T4 and the fifth transistor T5 in conduction state. The second control signal Scan2 is at a high voltage level to make the third transistor T3 in conduction state. The power supply VDD provides a power voltage Vdd which can be passed through the third transistor T3 and the fourth transistor T4 to a node a1 (see FIG. 5). The node a1 is also the control terminal of the driving transistor DTFT. Thus, the power voltage Vdd is charging the control terminal of the driving transistor DTFT. At the same time, the third control signal EM is at a low voltage level. The sixth transistor is turned off in non-conduction state. Effectively, in the first period, a voltage level at node a1 is Va1=Vdd.

In the first period, the driving transistor DTFT is in conduction state. Because the fifth transistor T5 is also in conduction state, a current flowing through the fifth transistor T5 flows to the reference voltage terminal VSS but not to the OLED so that the OLED will not be driven to emit light. Optionally, the reference voltage terminal VSS is supplied with a low voltage level. Optionally, the reference voltage terminal VSS is a grounded terminal.

Figure 6:
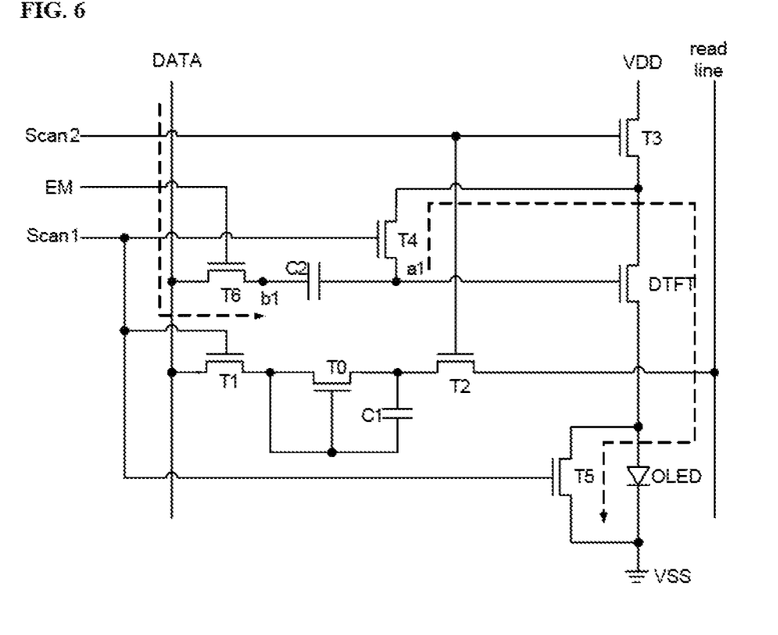
FIG. 6 is a circuit structure of a touch-control pixel-driving circuit operated in a second period according to an embodiment of the present disclosure.

In the second period, an operation state of the touch-control pixel-driving circuit of FIG. 3 is represented in FIG. 6. For the light-sensing-touch sub-circuit, the first control signal Scan1 is at a high voltage level, the first transistor T1 is turned on. The first capacitor C1 and the photo transistor T0 remain to be reset state. The second control signal Scan2 is at a low voltage level. The second transistor T2 is turned off resetting the first terminal of the photo transistor T0. At this time, the read line collects a signal that is still the same as the initial signal Vp in the first period.

For the driving sub-circuit, the first control signal Scan1 is at a high voltage level, turning on the fourth transistor T4 and the fifth transistor T5. A voltage signal at the node a1 can be passed through the fourth transistor 14, the driving transistor DTFT, and the fifth transistor T5 to drop to the reference voltage terminal VSS, effectively discharging the control terminal of the driving transistor DTFT. The discharging continues until the control terminal reaches to a threshold voltage Vth of the driving transistor DTFT. The second control signal Scan2 is at a low voltage level, turning off the third transistor T3. The power voltage signal from the power supply VDD cannot be passed through the third transistor T3 to reach the OLED. In the same period, the third control signal EM is at a high voltage level, turning on the sixth transistor T6 and passing the data signal with a voltage Vp to the node b1 (see FIG. 6). Effectively, in the second period, voltage level at node a1 is Va1=Vth, voltage level at node b1 is Vb1=Vp, and a voltage difference between node a1 and node b1 is $\Delta V=Vth-Vp$.

Figure 8A:
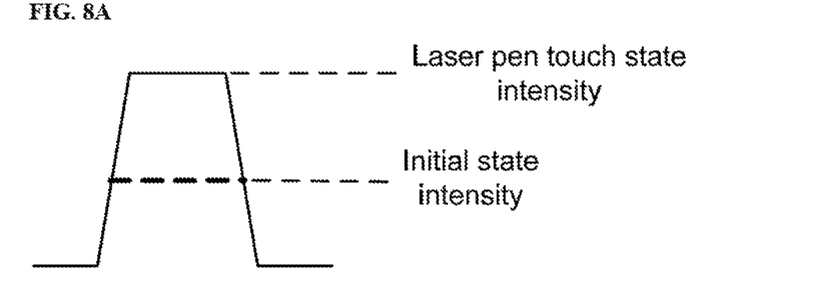
FIG. 8A is a schematic diagram showing a signal change detected in the read line as a touch occurs on the touch-control pixel-driving circuit according to an embodiment of the present disclosure.
Figure 8B:
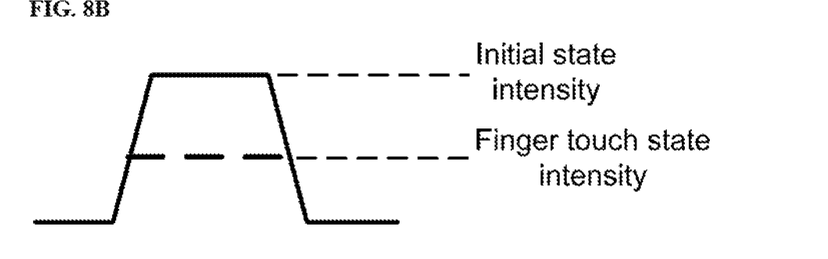
FIG. 8B s a schematic diagram showing a signal change detected in the read line as a touch occurs on the touch-control pixel-driving circuit according to another embodiment of the present disclosure.

So far, although the touch-control is not mentioned in the two periods above, the light-sensing touch control can be implemented any period in each driving cycle. Additionally, both finger touch control and laser pen touch control can be implemented. For example, as shown in FIG. 8A, when a laser pen sends a laser beam to 'touch' the display panel, the photo transistor T0 will detect an enhanced light intensity from external source due to the laser beam illumination. In another example, as shown in FIG. 8B, when a finger touches the display panel, because the finger block light from external source, the photo transistor T0 detects a lower light intensity from external source. Below, a light-sensing touch control occurred in the third period is illustrated.

Figure 7:
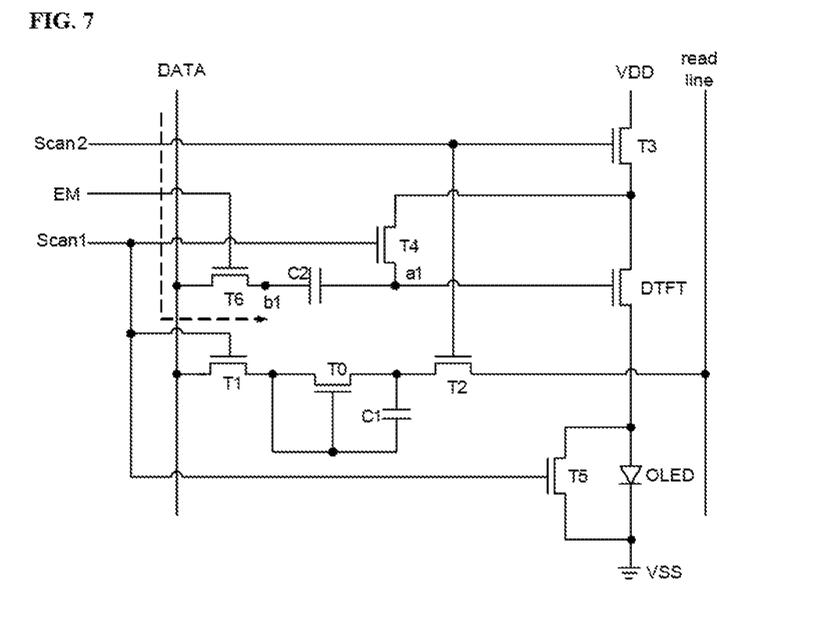
FIG. 7 is a circuit structure of a touch-control pixel-driving circuit operated in a third period according to an embodiment of the present disclosure.

In the third period, the touch-control pixel-driving circuit of FIG. 3 is in a specific operation state as shown in FIG. 7. For the light-sensing-touch sub-circuit, a laser pen generates a beam to illuminate or 'touch' the circuit. For different light intensity of the beam illuminated on the photo transistor T0, the photo transistor T0 detects different light signals with intensities higher than that of a nominal intensity from external source. The photo transistor T0 converts the light signal to an electrical signal stored in the first capacitor C1.

In the period, the second control signal Scan2 is at a low voltage level to turn off the second transistor T2. The read line still reads a voltage signal the same as the initial signal with a voltage level of Vp.

For the driving sub-circuit, the first control signal Scan1 is at a low voltage level, turning off the fourth transistor T4 and the fifth transistor T5. The second control signal Scan2 is also at a low voltage level, turning off the third transistor T3. Because both the third transistor T3 and the fourth transistor T4 are in non-conduction state, the driving transistor also is in non-conduction state. The third control signal EM is at a high voltage level, turning on the sixth transistor T6 to passing a data signal at this period to the node b1. The data signal in this period is raised from the initial level Vp to $Vp+\Delta V_{DATA}$. Node a1 is floated in this period, thus the voltage difference between node a1 and node b1 remains to be $\Delta V=Vth-Vp$. As the voltage level of node b1 is changed to $Vb1=Vp+\Delta V_{DATA}$, the voltage level at node a1 can be deduced to be $Va1=\Delta V_{DATA}+Vth$. During this period, both voltage levels at node a1 and node b1 are stabilized.

Figure 9:
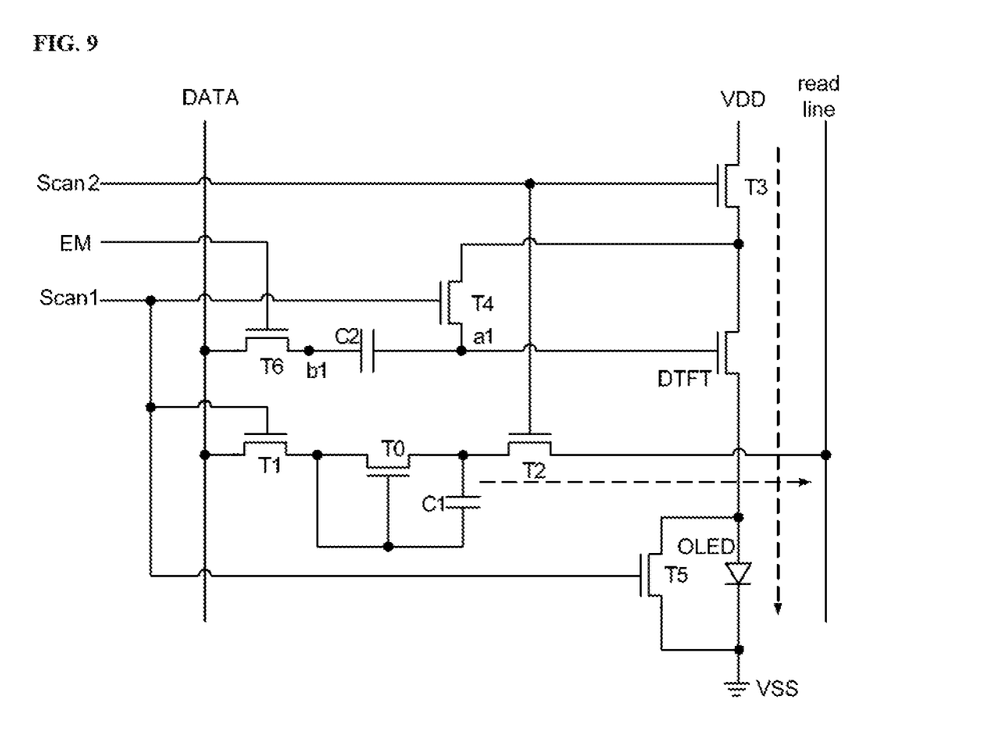
FIG. 9 is a circuit structure of a touch-control pixel-driving circuit operated in a fourth period according to an embodiment of the present disclosure.

In the fourth period, the touch-control pixel-driving circuit of FIG. 3 is in an operation state shown in FIG. 9. For the light-sensing-touch sub-circuit, the second control signal Scan2 is at a high voltage level, turning on the second transistor T2. The electrical signal stored in the first capacitor C1 can be passed through the third transistor T3 to the read line. Thus, the read line collects a signal change as shown in FIG. 4, i.e., a jump up in voltage level due to this newly added electrical signal.

For the driving sub-circuit, the first control signal Scan1 is at a low voltage level. The fourth transistor T4 and the fifth transistor T5 are turned off. The second control signal Scan2 is at a high voltage level, turning on the third transistor T3. The third control signal EM is at a low voltage level, turning off the sixth transistor T6. Therefore, a power voltage signal Vdd from the power supply VDD passes through the third transistor T3 and the driving transistor DTFT to reach the OLED, driving the OLED to emit light.

In an embodiment, when the touch-control pixel-driving circuit is operated in the fourth period, only the third transistor T3 is turned on and other transistors like T4, T5, and T6 are turned off in the driving sub-circuit. Therefore, it is ensured that only the power supply VDD provides a power voltage to the OLED and there is no interference from other signals of other transistors to the OLED during its might emission.

Figure 10:
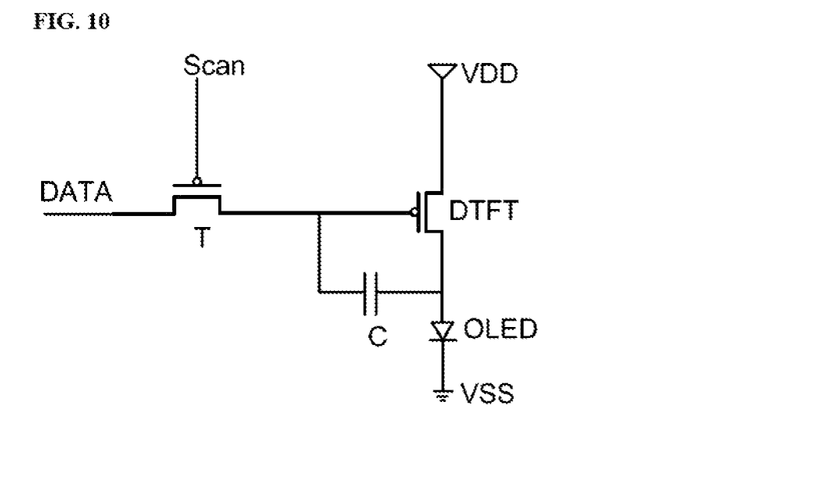
FIG. 10 is a circuit structure of a conventional pixel-driving circuit.

In a conventional pixel-driving circuit, for example in FIG. 10, with a 2T1C circuitry structure including a switch transistor T controlled by a control signal from a scan line, a driving transistor DTFT with its control terminal coupled to the switch transistor T and a first terminal coupled to a power supply VDD and a second terminal coupled to an OLED, and a capacitor C coupled between the control terminal and the second terminal of the driving transistor DTFT. Because a driving current outputted from the driving transistor for driving the OLED to emit light is depended on a threshold voltage Vth of the driving transistor DTFT, non-uniform values of threshold voltage Vth of the different driving transistors among different subpixels due to manufacture process variation and drifts over time will result in different changes in light emission intensities, affecting the display effect.

In the touch-control pixel-driving circuit disclosed in the present disclosure with the driving sub-circuit as shown in either one of FIG. 3, FIG. 5, FIG. 6, FIG. 7, and FIG. 9, the driving current flowing into the OLED in the fourth period can be expressed as $$I_{OLED}=K(V_{GS}-\text{Vth})^2, \quad (1)$$

where $V_{GS}$ is a voltage between the control terminal and the first terminal of the driving transistor DTFT. In particular, $V_{GS}=\Delta V_{DATA}+\text{Vth}-V_{OLED}$, where $V_{OLED}$ is a voltage drop on the OLED (or simply called an anode voltage of OLED assuming the second terminal of the OLED is supplied with a ground voltage level). Therefore, $$I_{OLED}=K(\Delta V_{DATA}-V_{OLED})^2. \quad (2)$$

Based on formula (2), the driving current flowing through the OLED is independent of the threshold voltage Vth of the driving transistor DTFT so that the effect of non-uniform drift of the threshold voltages on the OLED light emission is avoided.

In some embodiments as shown in FIG. 3, FIG. 5, FIG. 6, FIG. 7, and FIG. 9, all transistors in the touch-control pixel-driving circuit are N-type transistors, the second control signal and the third control signal are just set at opposite high/low voltage levels in a same period among all four periods in each driving cycle.

Figure 11:
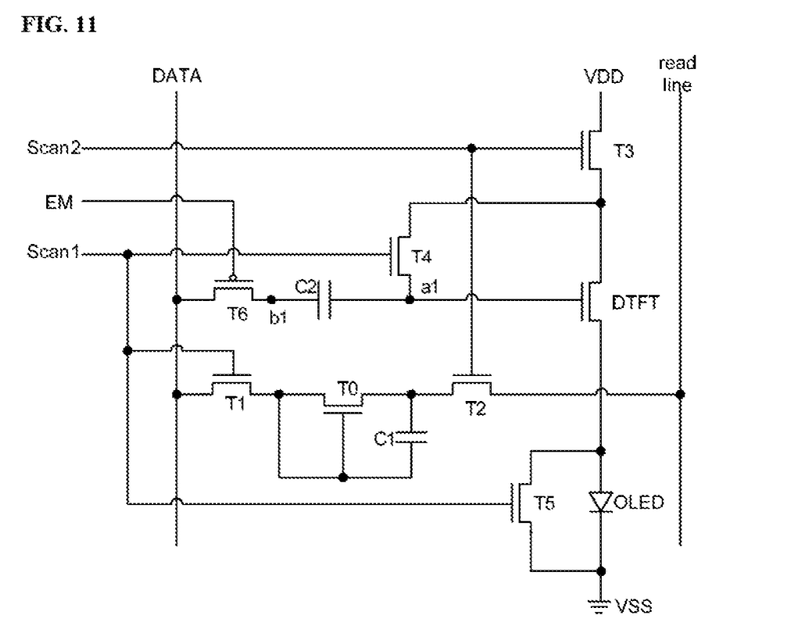
FIG. 11 is a circuit structure of a touch-control pixel-driving circuit according to another embodiment of the present disclosure.
Figure 12:
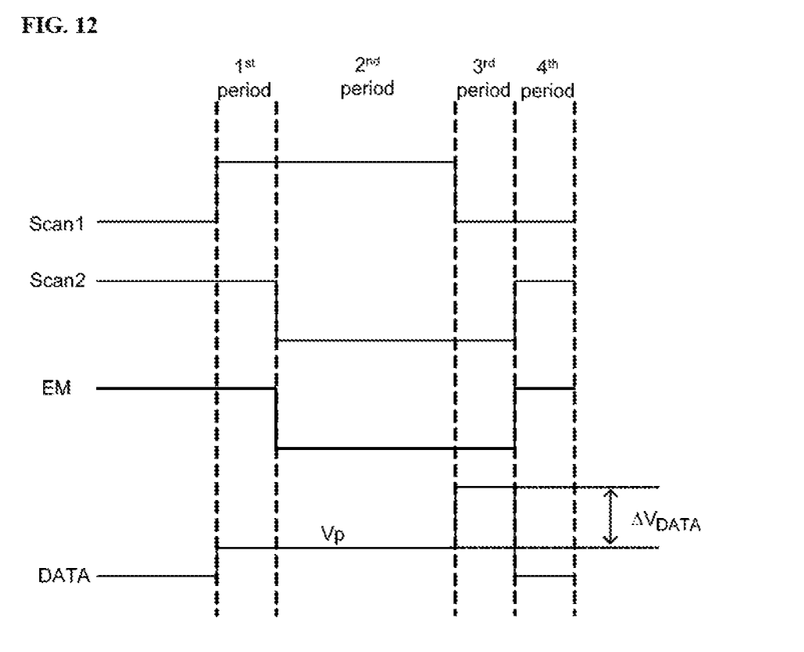
FIG. 12 is a timing diagram of operating the touch-control pixel-driving circuit of FIG. 11 according to another embodiment of the present disclosure.

In an alternative embodiment, as shown in FIG. 11, another touch-control pixel-driving circuit is provided with the sixth transistor T6 being a P-type transistor while all other transistors being N-type transistors. In the embodiment, an operation timing diagram of this touch-control pixel-driving circuit is shown in FIG. 12 with the second control signal and the third control signal being a same high voltage level in the first period, and a same low voltage level in the second and third period, and again a same high voltage level in the fourth period.

Figure 13:
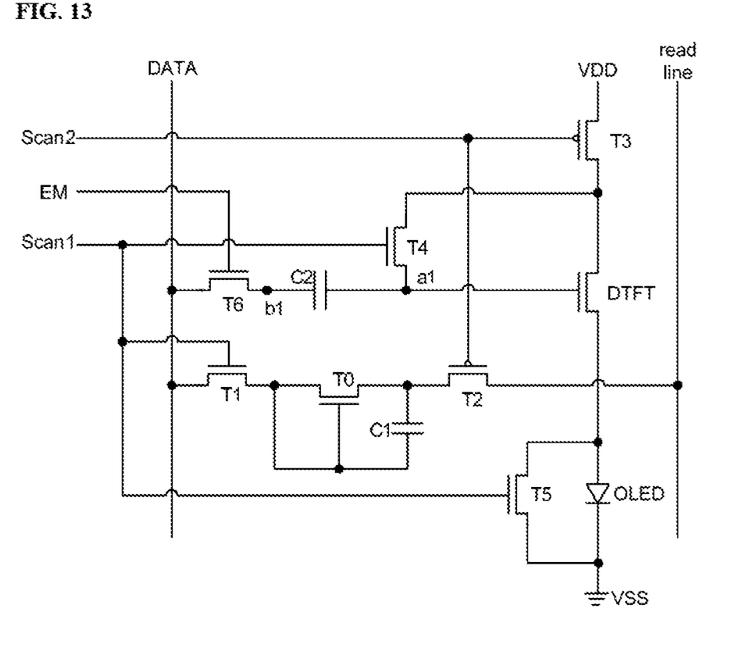
FIG. 13 is a circuit structure of a touch-control pixel-driving circuit according to yet another embodiment of the present disclosure.
Figure 14:
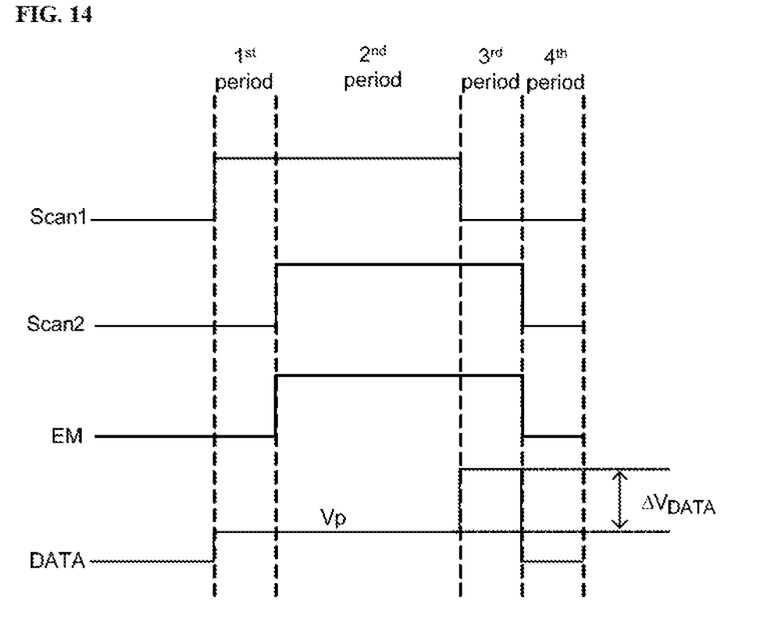
FIG. 14 is a timing diagram of operating the touch-control pixel-driving circuit of FIG. 13 according to another embodiment of the present disclosure.

In another alternative embodiment, as shown in FIG. 13, yet another touch-control pixel-driving circuit is provided with the second transistor T2 and the third transistor T3 being P-type transistors and other transistors (DTFT, T0, T1, T4, T5, and T6) being N-type transistors. In the embodiment, an operation timing diagram of this touch-control pixel-driving circuit is shown in FIG. 14 with the second control sural and the third control signal being a same low voltage level in the first period, and a same high voltage level in the second and third period, and again a same low voltage level in the fourth period.

In some embodiments, the controls of the first control signal the second control signal, and the third control signal to respective transistors are similar in principle no matter the second control signal and the third control signal are set at opposite or same high/low voltage levels in each of the four periods of each driving cycle.

In an embodiment, when the second control signal and the third control signal are set at same high/low voltage levels in a same period of the four periods in each driving cycle, the second scan line Scan2 and the third scan line EM can be combined into one scan line, further reducing number of scan lines in the display panel for simplifying the process of conductor line layout and reducing complexity of implementing touch control function to the display apparatus.

In another aspect, the present disclosure provides a method for driving the touch-control pixel-driving circuit in a display panel described herein. The method includes operating the touch-control pixel-driving circuit in a driving cycle of driving light emission and touch sensing including a first period, a second period, a third period, and a fourth period. The method includes resetting the light-sensing-touch sub-circuit upon the first control signal to charge a power-supply voltage into a control terminal of the driving transistor further upon the second control signal in the first period, discharging, the control terminal of the driving transistor in the second period with the first control signal been maintained to keep the light-sensing-touch sub-circuit in a same state as in the first period, sensing a light signal which is converted to a current signal in the third period and writing a data signal into the control terminal of the driving transistor controlled by the third control signal, and transporting the current signal to the read line in the fourth period and using the second control signal to control a driving current through the driving transistor for causing the OLED to emit light.

In some embodiments, the method is able to drive both a light-sensing-touch sub-circuit and a driving sub-circuit to operate together in different periods of each driving cycle. In some embodiments, the method is applied to drive the touch-control pixel-driving circuit implemented in an AMOLED display apparatus to realize its display function and touch control function in a same display panel. In an embodiment each of the driving transistor, the photo transistor, the first transistor, the second transistor, the third transistor, the fourth transistor, the fifth transistor, and the sixth transistor in a touch-control pixel-driving circuit (see FIG. 3) is provided as a N-type thin-film transistor, the method includes setting the first control signal to a high voltage level in the first period and the second period to a low voltage level in the third period and the fourth period; setting the second control signal to the high voltage level in the first period, the low voltage level in the second period and the third period, and the high voltage level in the fourth period; and setting the third control signal to the low voltage level in the first period, the high voltage level in the second period and the third period, and the low voltage level in the fourth period.

In some embodiments, the method includes setting the second control signal and the third control signal with opposite high or low voltage levels in a same period of the first period, the second period, the third period, and the fourth period.

In another embodiment, the sixth transistor T6 is provided as a P-type thin-film transistor and each of the driving transistor, the photo transistor, the first transistor, the second transistor, the third transistor, the fourth transistor, and the fifth transistor is provided as a N-type thin-film transistor in a touch-control pixel-driving circuit (see FIG. 11), the method includes setting the first control signal to a high voltage level in the first period and the second period, the low voltage level in the third period and the fourth period; and setting both the second control signal and the third control signal to the high voltage level in the first period, the low voltage level in the second period and the third period, and the high voltage level in the fourth period.

In yet another embodiment, each of the second transistor and the third transistor is provided as a P-type thin-film transistor and each of the driving transistor, the photo transistor, the first transistor, the fourth transistor, the fifth transistor, and the sixth transistor is provided as a N-type thin-film transistor in a touch-control pixel-driving circuit (see FIG. 13), the method includes setting the first control signal to a high voltage level in the first period and the second period, the low voltage level in the third period and the fourth period; and setting both the second control signal and the third control signal are set to the low voltage level in the first period, the high voltage level in the second period and the third period, and the low voltage level in the fourth period.

Figure 15:
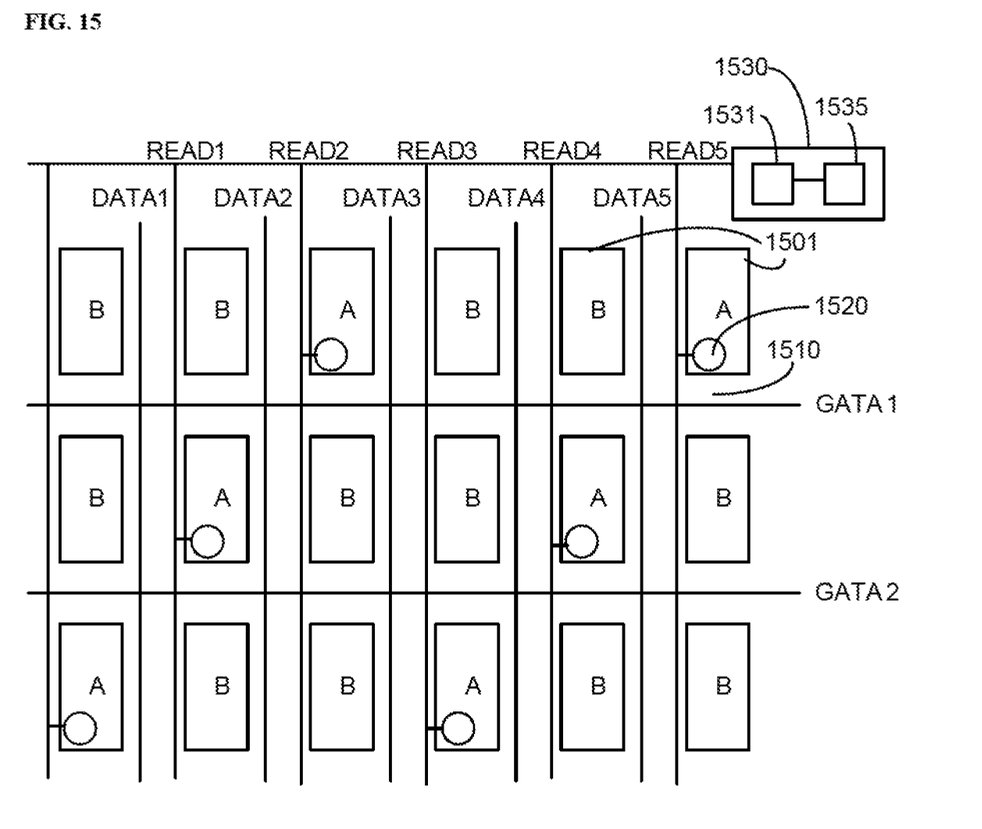
FIG. 15 is a schematic diagram of a touch display apparatus according to an embodiment of the present disclosure.

In another aspect, the present disclosure provides a touch display apparatus having both a display function and a touch control function. FIG. 15 is a schematic diagram of a touch display apparatus according to an embodiment of the present disclosure. Referring to FIG. 15, the display apparatus includes a display area having a plurality of subpixel regions 1501 in an array of matrix divided by an inter-subpixel region 1510. Optionally, at least one subpixel A of the plurality of subpixel regions 1501 contains a light-sensing-touch sub-circuit 1520 of the touch-control pixel-driving circuit. Optionally, there is a sub-set of the plurality of subpixel regions 1501 each of which is the same as the subpixel A containing a light-sensing-touch sub-circuit 1520. Optionally, the sub-set of subpixels A is arranged in a periodic arrangement. Each subpixel, including the sub-set of subpixels A containing the light-sensing-touch sub-circuit 1520 and remaining sub-set of subpixels B without the light-sensing-touch sub-circuit 1520, includes at least a driving sub-circuit coupled to a data line DATA in parallel to a column of subpixels. Each light-sensing-touch sub-circuit 1520 (in a column) is coupled to a read line READ in parallel to a column of subpixels. Each line GATA in parallel to a row of subpixels is schematically provided to represent one of scan lines (such as Scan1, Scan2, or EM, see FIG. 3) for providing control signals to the touch-control pixel-driving circuits in a row of subpixels.

In an embodiment, the touch display apparatus further includes a signal processing block 1530 configured to couple to each light-sensing-touch sub-circuit through the corresponding read line and to process a photocurrent signal converted from a light signal sensed by each light-sensing-touch sub-circuit to determine whether a touch occurs on the display area and determine corresponding touch location on the display area if the touch is determined. Optionally, the touch is a laser beam illumination. Optionally, the touch is a finger touch. In a specific embodiment, the signal processing block 1530 includes an amplifier 1531 and a processor 1535. The amplifier 1531 is coupled to the light-sensing-touch sub-circuit 1520 via the read line READ to receive the photocurrent signal to generate an amplified signal. The processor 1535 is coupled to the amplifier 1531 to compare an intensity difference between the amplified signal with a raw signal with a non-touching threshold value. Optionally, the processor 1535 is configured to determine a touch occurrence and corresponding touch location if the intensity difference is greater than the non-touching threshold value. Optionally, the processor 1535 is configured to determine no touch occurrence if the intensity difference is smaller than the non-touching threshold value. Optionally, the touch location determined with a X coordinate based on a location of a second scan line Scan2 from which a second control signal is outputted and a Y coordinate based on a location of the light-sensing-touch sub-circuit 1520 along a read line READ from which the photocurrent signal is collected.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated.

It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch-control pixel-driving circuit in a display apparatus, the circuit comprising:
  a driving transistor;
  an organic light-emitting diode (OLED) having a first electrode, and a second electrode coupled to a reference voltage terminal;
  a light-sensing-touch sub-circuit coupled to a data line and a read line and configured to be reset by a first control signal and a second control signal to send a raw signal to the read line based on a high-level voltage at the data line, and to generate a sensing signal depended on a change of the raw signal due to a touch and send the sensing signal to the read line; and
  a driving sub-circuit coupled to the driving transistor and configured to charge and discharge the driving transistor using a power-supply voltage from a power terminal and a data signal from the data line controlled by the first control signal, the second control signal and a third control signal, and to drive the OLED for emitting light;
  wherein the driving transistor is electrically coupled to the data line and optically coupled through the light-sensing-touch sub-circuit to the read line; and
  the first electrode is electrically coupled to the driving transistor and optically coupled through the light-sensing-touch sub-circuit to the read line;
  wherein the light-sensing-touch sub-circuit comprises a photo transistor, a reset sub-subcircuit coupled to the photo transistor and the data line and configured to receive the first control signal, a transport sub-subcircuit coupled to the photo transistor and the read line and configured to receive the second control signal, and a storage sub-subcircuit coupled to the photo transistor for storing a current signal converted by the photo transistor sensing a light signal;
  wherein the reset sub-subcircuit comprises a first transistor having a control terminal being provided with the first control signal, a first terminal coupled to the data line, and a second terminal coupled a control terminal and a second terminal of the photo transistor, wherein the first control signal is configured to provide a turn-on signal to make the first transistor in conduction state in a reset period to allow an initial data signal at a high voltage level from the data line as the raw signal to be passed to the photo transistor;

wherein the photo transistor is configured to generate a photocurrent signal upon being illuminated by an external light signal, the photocurrent signal being added to the raw signal as a change of the raw signal;

wherein the transport sub-subcircuit comprises a second transistor having a control terminal being provided with the second control signal, a first terminal coupled to a first terminal of the photo transistor, and a second terminal coupled to the read line, wherein the second control signal is configured to provide a turn-on signal to make the second transistor in conduction state to allow the either the raw signal or the change of the raw signal from the photo transistor to be passed to the read line.

2. The circuit of claim 1, wherein the storage sub-subcircuit comprises a first capacitor having a first electrode coupled to a first terminal of the photo transistor and a second electrode coupled to a control terminal of the photo transistor.

3. The circuit of claim 1, wherein the driving sub-circuit comprises a charger sub-subcircuit and a regulator sub-subcircuit, wherein the charger sub-subcircuit is configured to couple with the power terminal, the driving transistor, and the reference voltage terminal, and is configured to receive the first control signal and the second control signal to control charging or discharging of the driving transistor by the power-supply voltage from the power terminal, wherein the regulator sub-subcircuit is configured to couple with the data line and the driving transistor, and configured to receive the third control signal to regulate a voltage level at a control terminal of the driving transistor.

4. The circuit of claim 3, wherein the charger sub-subcircuit is further configured to receive the second control signal to make the driving transistor in conduction state for passing a driving current to drive the OLED for emitting light.

5. The circuit of claim 3, wherein the charger sub-subcircuit comprises:
a third transistor having a control terminal being provided with the second control signal, a first terminal coupled to the power terminal, and a second terminal coupled to a first terminal of the driving transistor;
a fourth transistor having a control terminal being provided with the first control signal, a first terminal coupled to the second terminal of the third transistor, and a second terminal coupled to the control terminal of the driving transistor;
a fifth transistor having a control terminal being provided with the first control signal, a first terminal coupled to a second terminal of the driving transistor, and a second terminal coupled to the reference voltage terminal.

6. The circuit of claim 3, wherein the regulator sub-subcircuit comprises a sixth transistor and a second capacitor, wherein:
the sixth transistor has a control terminal being provided with the third control signal, a first terminal coupled to the data line, and a second terminal coupled to a first electrode of the second capacitor;
the second capacitor has a second electrode coupled to the control terminal of the driving transistor.

7. The circuit of claim 3, wherein the power terminal provides the power-supply voltage at a high voltage level and the reference voltage terminal is grounded at a low voltage level.

8. A method for driving a touch-control pixel-driving circuit in a driving cycle including a first period, a second period, a third period, and a fourth period,
wherein the touch-control pixel-driving circuit includes:
a driving transistor;
an organic light-emitting diode (OLED) having a first electrode, and a second electrode coupled to a reference voltage terminal;
a light-sensing-touch sub-circuit coupled to a data line and a read line and configured to be reset by a first control signal and a second control signal to send a raw signal to the read line based on a high-level voltage at the data line, and to generate a sensing signal depended on a change of the raw signal due to a touch and send the sensing signal to the read line; and
a driving sub-circuit coupled to the driving transistor and configured to charge and discharge the driving transistor using a power-supply voltage from a power terminal and a data signal from the data line controlled by the first control signal, the second control signal and a third control signal, and to drive the OLED for emitting light;
wherein the driving transistor is electrically coupled to the data line and optically coupled through the light-sensing-touch sub-circuit to the read line; and
the first electrode is electrically coupled to the driving transistor and optically coupled through the light-sensing-touch sub-circuit to the read line;
the method comprising:
resetting the light-sensing-touch sub-circuit upon the first control signal to charge a power-supply voltage into a control terminal of the driving transistor further upon the second control signal in the first period;
discharging the control terminal of the driving transistor in the second period with the first control signal been maintained to keep the light-sensing-touch sub-circuit in a same state as in the first period;
sensing a light signal which is converted to a current signal in the third period and writing a data signal into the control terminal of the driving transistor controlled by the third control signal; and
transporting the current signal to the read line in the fourth period and using the second control signal to control a driving current through the driving transistor for causing the OLED to emit light.

9. The method of claim 8, wherein the second control signal and the third control signal are set with high or low voltage levels in a same period of the first period, the second period, the third period, and the fourth period.

10. The method of claim 9, wherein each of the driving transistor, the photo transistor, the first transistor, the second transistor, the third transistor, the fourth transistor, the fifth transistor, and the sixth transistor is provided as a N-type thin-film transistor, wherein the first control signal is set to a high voltage level in the first period and the second period and set to a low voltage level in the third period and the fourth period; the second control signal is set to the high voltage level in the first period, the low voltage level in the second period and the third period, and the high voltage level in the fourth period; and the third control signal is set to the low voltage level in the first period, the high voltage level in the second period and the third period, and the low voltage level in the fourth period.

11. The method of claim 8, wherein the second control signal and the third control signal have a same voltage level in a same period of the first period, the second period, the third period, and the fourth period.

12. The method of claim 11, wherein the sixth transistor is provided as a P-type thin-film transistor and each of the driving transistor, the photo transistor, the first transistor, the second transistor, the third transistor, the fourth transistor, and the fifth transistor is provided as a N-type thin-film transistor, wherein the first control signal is set to a high voltage level in the first period and the second period, the low voltage level in the third period and the fourth period; both the second control signal and the third control signal are set to the high voltage level in the first period, the low voltage level in the second period and the third period, and the high voltage level in the fourth period.

13. The method of claim 11, wherein each of the second transistor and the third transistor is provided as a P-type thin-film transistor and each of the driving transistor, the photo transistor, the first transistor, the fourth transistor, fifth transistor, and the sixth transistor is provided as a N-type thin-film transistor, wherein the first control signal is set to a high voltage level in the first period and the second period, the low voltage level in the third period and the fourth period; both the second control signal and the third control signal are set to the low voltage level in the first period, the high voltage level in the second period and the third period, and the low voltage level in the fourth period.

14. A touch display apparatus comprising a display area having a plurality of subpixel regions arranged in an array of matrix divided by an inter-subpixel region, wherein at least one subpixel of the plurality of subpixel regions comprises a light-sensing-touch sub-circuit of a touch-control pixel-driving circuit;
   wherein the touch-control pixel-driving circuit includes:
   a driving transistor;
   an organic light-emitting diode (OLED) having a first electrode, and a second electrode coupled to a reference voltage terminal;
   a light-sensing-touch sub-circuit coupled to a data line and a read line and configured to be reset by a first control signal and a second control signal to send a raw signal to the read line based on a high-level voltage at the data line, and to generate a sensing signal depended on a change of the raw signal due to a touch and send the sensing signal to the read line; and
   a driving sub-circuit coupled to the driving transistor and configured to charge and discharge the driving transistor using a power-supply voltage from a power terminal and a data signal from the data line controlled by the first control signal, the second control signal and a third control signal, and to drive the OLED for emitting light;
   wherein the driving transistor is electrically coupled to the data line and optically coupled through the light-sensing-touch sub-circuit to the read line; and
   the first electrode is electrically coupled to the driving transistor and optically coupled through the light-sensing-touch sub-circuit to the read line.

15. The touch display apparatus of claim 14, wherein each of a sub-set of the plurality of subpixel regions comprises the light-sensing-touch sub-circuit, the sub-set of the plurality of subpixel regions being arranged in a periodic arrangement in the display area.

16. The touch display apparatus of claim 14, further comprising a signal processing block configured to process the photocurrent signal converted from a light signal sensed by the light-sensing-touch sub-circuit to determine whether a touch occurs on the display area and determine corresponding touch location on the display area if the touch is determined, wherein the touch is either a laser beam illumination or a finger touch, wherein the signal processing block comprises an amplifier and a processor, the amplifier being coupled to the light-sensing-touch sub-circuit to receive the photocurrent signal to generate an amplified signal, the processor being coupled to the amplifier to compare an intensity difference between the amplified signal with a raw signal with a non-touching threshold value and determine a touch occurrence and corresponding touch location if the intensity difference is greater than the non-touching threshold value or determine no touch occurrence if the intensity difference is smaller than the non-touching threshold value, wherein the touch location determined with a X coordinate based on a control line location from which a second control signal is outputted and a Y coordinate based on a location of the light-sensing-touch sub-circuit along a read line from which the photocurrent signal is collected.

* * * * *